United States Patent
Tanaka et al.

(10) Patent No.: US 10,094,565 B2
(45) Date of Patent: Oct. 9, 2018

(54) GAS TURBINE COMBUSTOR AND GAS TURBINE

(71) Applicant: MITSUBISHI HITACHI POWER SYSTEMS, LTD., Kanagawa (JP)

(72) Inventors: Yusuke Tanaka, Tokyo (JP); Satoshi Takiguchi, Tokyo (JP); Keijiro Saito, Tokyo (JP); Shinji Akamatsu, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/301,812

(22) PCT Filed: Apr. 21, 2015

(86) PCT No.: PCT/JP2015/062122
§ 371 (c)(1),
(2) Date: Oct. 4, 2016

(87) PCT Pub. No.: WO2015/178149
PCT Pub. Date: Nov. 26, 2015

(65) Prior Publication Data
US 2017/0122563 A1 May 4, 2017

(30) Foreign Application Priority Data

May 23, 2014 (JP) ................................ 2014-107259

(51) Int. Cl.
*F23R 3/18* (2006.01)
*F23R 3/10* (2006.01)
(Continued)

(52) U.S. Cl.
CPC .................. *F23R 3/18* (2013.01); *F02C 3/04* (2013.01); *F23R 3/10* (2013.01); *F23R 3/26* (2013.01); *F23R 3/286* (2013.01); *F23R 3/343* (2013.01)

(58) Field of Classification Search
CPC .............. F23R 3/18; F23R 3/24; F23R 3/343
See application file for complete search history.

(56) References Cited

U.S. PATENT DOCUMENTS

| 7,143,583 B2 * | 12/2006 | Hayashi | F23R 3/18 60/737 |
| 8,646,275 B2 * | 2/2014 | Rackwitz | F23R 3/343 60/737 |

(Continued)

FOREIGN PATENT DOCUMENTS

| JP | 8-28872 | 2/1996 |
| JP | 2003-130351 | 5/2003 |

(Continued)

OTHER PUBLICATIONS

JP H08-28872 machine translation from Espacenet, Foriegn document cited and attached by Applicant.*

(Continued)

*Primary Examiner* — Andrew Nguyen
*Assistant Examiner* — Stephanie Cheng
(74) *Attorney, Agent, or Firm* — Wenderoth, Lind & Ponack, L.L.P.

(57) ABSTRACT

A gas turbine combustor and a gas turbine include a pilot burner, a plurality of main burners, and a flame stabilizer. A first air ejection portion is adapted to eject first air toward a tip end portion side between the main burners and the flame stabilizer, a second air ejection portion is adapted to circulate second air toward a tip end portion side outside the flame stabilizer and eject the second air toward a radially outward direction, and a change member is adapted to change an (Continued)

ejecting direction of the second air ejected through the second air ejection portion to an axial center direction of the flame stabilizer.

7 Claims, 10 Drawing Sheets

(51) Int. Cl.
*F23R 3/26* (2006.01)
*F23R 3/28* (2006.01)
*F23R 3/34* (2006.01)
*F02C 3/04* (2006.01)

(56) References Cited

U.S. PATENT DOCUMENTS

| | | |
|---|---|---|
| 2010/0308135 A1 | 12/2010 | Yamamoto et al. |
| 2010/0319351 A1* | 12/2010 | Inoue .................... F23D 14/70 60/748 |
| 2011/0219776 A1 | 9/2011 | Bunker et al. |
| 2012/0305673 A1 | 12/2012 | Matsuyama et al. |
| 2014/0305094 A1 | 10/2014 | Inoue et al. |
| 2014/0305095 A1 | 10/2014 | Inoue et al. |
| 2015/0082797 A1 | 3/2015 | Matsuyama et al. |

FOREIGN PATENT DOCUMENTS

| | | |
|---|---|---|
| JP | 2004-101071 | 4/2004 |
| JP | 2004101071 A * | 4/2004 |
| JP | 2004-360944 | 12/2004 |
| JP | 2005-114193 | 4/2005 |
| JP | 2010-281483 | 12/2010 |
| JP | 2012-251742 | 12/2012 |
| JP | 2013-190196 | 9/2013 |
| KR | 10-2010-0018604 | 2/2010 |
| WO | 2009/081856 | 7/2009 |
| WO | 2013/183618 | 12/2013 |

OTHER PUBLICATIONS

Oota, JP 2005-114193 machine translation from Espacenet, Foreign document cited and attached by Applicant.*
International Search Report dated Aug. 4, 2015 in International (PCT) Application No. PCT/JP2015/062122.
Written Opinion of the International Searching Authority dated Aug. 4, 2015 in International (PCT) Application No. PCT/JP2015/062122, with English translation.
Notification of Reasons for Refusal dated May 23, 2017 in Japanese Application No. 2016-521007, with English translation.
Notification of Reason for Refusal dated Feb. 14, 2018 in Korean Application No. 10-2016-7027541, with English translation.

* cited by examiner

GAS TURBINE COMBUSTOR AND GAS TURBINE

FIELD

The present invention relates to, in a gas turbine that supplies a fuel to compressed high-temperature and high-pressure air and burns the fuel, and supplies generated combustion gas to a turbine to obtain rotary power, a gas turbine combustor used in the gas turbine, and the gas turbine.

BACKGROUND

A gas turbine is configured from a compressor, a combustor, and a turbine. Air taken in through an air inlet is compressed by the compressor to become high-temperature and high-pressure compressed air. The combustor supplies a fuel to the compressed air and burns the fuel. The high-temperature and high-pressure combustion gas drives the turbine to drive a generator coupled to the turbine. In this case, the turbine is configured such that a plurality of turbine vanes and turbine blades are alternately arranged in a casing, and the turbine blades are driven by the combustion gas, so that an output shaft coupled to the generator is driven and rotated. Then, the combustion gas that has driven the turbine is discharged into the atmosphere as a fuel gas.

The combustor is provided with a plurality of main burners that performs premix combustion, and a pilot burner that performs diffusion combustion. Therefore, a diffusion flame generated by the pilot burner is used as pilot light for generating a premixed flame by the main burners. Accordingly, the premix combustion is maintained. In a typical combustor, the main burners are arranged in a circumferential direction at equal intervals outside in a radial direction around the pilot burner.

As such a gas turbine combustor, for example, there is one described in Japanese Patent Publication No. 2005-114193. The gas turbine combustor described in Japanese Patent Publication No. 2005-114193 includes a pilot nozzle provided in a central portion of a body inner cylinder, a plurality of main nozzles provided outside the pilot nozzle along the circumferential direction, and a pilot cone provided at a downstream side of the main nozzles, and an air passage that ejects the air toward a downstream side of a tip end portion of the pilot cone is provided.

Technical Problem

As described above, air-fuel mixture of the air and the fuel injected form the main burners becomes a swirling circulating flow, and the diffusion flame generated by the pilot burner serves as the pilot light and ignites the air-fuel mixture to generate a premixed flame. At this time, if turbulence of the air-fuel mixture is insufficient on the flame surface, which is formed such that the air-fuel mixture of the air and the fuel injected from the main burners is ignited by the diffusion flame generated by the pilot burner, combustion may become unstable. This unstable flame is moved to a downstream side or an upstream side from the flame stabilizer (pilot cone). If this unstable flame is moved to the downstream side from the flame stabilizer, the combustion becomes unstable. If the unstable flame is moved to the upstream side from the flame stabilizer, the movement becomes a cause of a risk of flashback or an increase in NOx. Therefore, it is necessary to maintain the source of the flame to an appropriate position.

SUMMARY

The present invention solves the above problem, and an objective is to provide a gas turbine combustor and a gas turbine that stabilize combustion by controlling the position of flame to an appropriate position.

Solution to Problem

To solve the above problem, the present invention provides a gas turbine combustor, the gas turbine combustor includes a combustion chamber having a cylindrical shape; a pilot burner arranged in a central portion in the combustion chamber; a plurality of main burners arranged to surround the pilot burner in the combustion chamber; a flame stabilizer covering an outside of a pilot nozzle in the pilot burner and having a tapered cylinder shape where a tip end portion side radially expands; a first air ejection portion adapted to eject air toward a tip end portion side outside the main burners; a second air ejection portion adapted to circulate air toward a tip end portion side outside the flame stabilizer and eject air toward an outside in a radial direction; and a change member adapted to change an ejecting direction of the air ejected through the second air ejection portion to an axial center direction of the flame stabilizer.

Therefore, the main burners inject air-fuel mixture of compressed air and a fuel along an inner peripheral surface of a combustion chamber as pre-air-fuel mixture, and the pilot burner injects the air-fuel mixture of compressed air and a fuel into a central portion of the combustion chamber. Then, the air-fuel mixture from the pilot burner is ignited and burned, a part of the combustion gas is diffused around with flame in the combustion chamber, and the pre-air-fuel mixture of the main burners is ignited and the premix combustion is maintained. At this time, the first air ejection portion ejects the air toward the tip end portion side outside the main burners and the second air ejection portion ejects the air outside the flame stabilizer, and the change member changes the ejecting direction of the air ejected through the second air ejection portion to the axial center direction of the flame stabilizer. That is, the position in a front-back direction of the fame surface formed such that the air-fuel mixture from the main burners is ignited by the diffusion flame of the pilot burner has an optimum position according to a combustion form of the combustor. Then, the position of the flame surface is moved backward and forward according to the air flow from the first air ejection portion. Therefore, by changing the direction of the air flow from the first air ejection portion by the air form from the second air ejection portion with a changed injecting direction by the change member, the position in a front-back direction of the flame surface can be adjusted to the optimum position. As a result, the position of the flame is controlled to an appropriate position, so that the combustion can be stabilized.

In the gas turbine combustor, the second air ejection portion includes a first air passage provided outside the flame stabilizer and adapted to circulate the air toward a tip end portion side, a second air passage adapted to circulate the air from the tip end portion side of the first air passage toward an outside in the radial direction, and an air ejection port provided in the tip end portion side of the second air passage, and the change member is provided in the air ejection port.

Therefore, the change member is provided in the air ejection port in the second air ejection portion, so that the direction of the air flow ejected through the second air ejection portion can be easily changed, and the structure can be simplified.

In the gas turbine combustor, the flame stabilizer includes a flame stabilizer body having a cylindrical shape, a tapered cylinder portion having a tapered cylinder shape continuing to the tip end portion side of the flame stabilizer body, and a tapered external cylinder portion arranged outside the tapered cylinder portion with a predetermined space, the first air passage, the second air passage, and the air ejection port are provided between the tapered cylinder portion and the tapered external cylinder portion, and the change member is provided in at least one of the tapered cylinder portion and the tapered external cylinder portion.

Therefore, the change member is provided in the tapered cylinder portion or the tapered external cylinder portion in the flame stabilizer, so that the direction of the air flow ejected through the second air ejection portion can be easily changed to one side or the other side in the axial center direction of the flame stabilizer.

In the gas turbine combustor, the change member is provided in a tip end portion of the tapered cylinder portion, and changes an ejecting direction of the air ejected through the air ejection port toward the air ejected through the first air ejection portion.

Therefore, the air ejected through the air ejection port of the second air ejection portion is directed to the air ejected through the first air ejection portion by the change member provided in the tip end portion of the tapered cylinder portion, so that the direction of the air flow ejected through the first air ejection portion can be easily and properly changed.

In the gas turbine combustor, the change member changes the ejecting direction of the air ejected through the air ejection port to become an opposite direction to an ejecting direction of the air ejected through the first air ejection portion.

Therefore, the air flow ejected through the air ejection port of the second air ejection portion becomes the opposite direction to the air flow ejected through the first air ejection portion by the change member, so that energy of the air flow ejected through the first air ejection portion can be easily adjusted and the direction can be properly changed.

In the gas turbine combustor, the change member is provided in a tip end portion of the tapered cylinder portion, and changes the ejecting direction of the air ejected through the air ejection port to become a same direction as an ejecting direction of the air ejected through the first air ejection portion.

Therefore, the air flow ejected through the air ejection port of the second air ejection portion becomes the same direction as the air flow ejected through the first air ejection portion by the change member provided in the tip end portion of the tapered cylinder portion, so that energy of the air flow ejected through the first air ejection portion can be easily adjusted and the direction can be properly changed.

In the gas turbine combustor, the change member is provided in a tip end portion of the tapered external cylinder portion, and changes the ejecting direction of the air ejected through the air ejection port to become a same direction as an ejecting direction of the air ejected through the first air ejection portion.

Therefore, the air flow ejected through the air ejection port of the second air ejection portion becomes the same direction as the air flow ejected through the first air ejection port by the change member provided in the tip end portion of the tapered external cylinder portion, so that energy of the air flow ejected through the first air ejection portion can be easily adjusted and the direction can be properly changed.

In the gas turbine combustor, the main burner includes a main burner cylinder, a main nozzle provided in a central portion of the main burner cylinder, and a swirler vane provided between the main burner cylinder and the main nozzle, and the change member is provided in an entire area facing the main burner cylinder.

Therefore, the change member is provided in the entire area facing the main burner cylinder, so that the position in a front-back direction of the flame surface formed such that air-fuel mixture from the main burners is ignited by diffusion flame of the pilot burner can be adjusted to an appropriate position according to a combustion form of the combustor.

In the gas turbine combustor, the main burner includes a main burner cylinder, a main nozzle provided in a central portion of the main burner cylinder, and a swirler vane provided between the main burner cylinder and the main nozzle, and the change member is provided in a partial area facing the main burner cylinder.

Therefore, the change member is provided in a partial area facing the main burner cylinder, so that the position in a front-back direction of the flame surface formed such that air-fuel mixture from the main burners is ignited by diffusion flame of the pilot burner can be adjusted to an appropriate position according to a combustion form of the combustor.

In the gas turbine combustor, the tapered cylinder portion is configured such that a plurality of divided bodies is combined in a cylindrical shape, and the change member is provided in at least a partial area of the divided bodies.

Therefore, the change member can be provided in a desired area in the tapered cylinder portion.

A gas turbine in this invention includes a compressor adapted to compress air; the combustor adapted to mix and burn compressed air compressed by the compressor and a fuel; and a turbine adapted to obtain rotary power by a combustion gas generated by the combustor.

Therefore, the position of the flame is controlled to the appropriate position, and combustion can be stabilized and the performance can be improved.

Advantageous Effects of Invention

According to a gas turbine combustor and a gas turbine of the present invention, a first air ejection portion that ejects air outside a main burner, a second air ejection portion that ejects air outside a flame stabilizer and outside in a radial direction, and a change member that changes an ejecting direction of the air ejected through the second air ejection portion to an axial center direction of the flame stabilizer are provided. Therefore, the direction of an air flow through the first air ejection portion is changed by an air flow through the second air ejection portion with a changed injecting direction by the change member, so that the position in a front-back direction of a flame surface can be adjusted to an optimum position, and combustion can be stabilized.

DESCRIPTION OF EMBODIMENTS

Favorable embodiments of a gas turbine combustor and a gas turbine according to the present invention will be hereinafter described in detail with reference to the appended drawings. Note that the present invention is not limited by these embodiments, and in a case where there is a plurality of embodiments, the present invention also includes those configured by combining the embodiments.

[First Embodiment]

Figure 1:
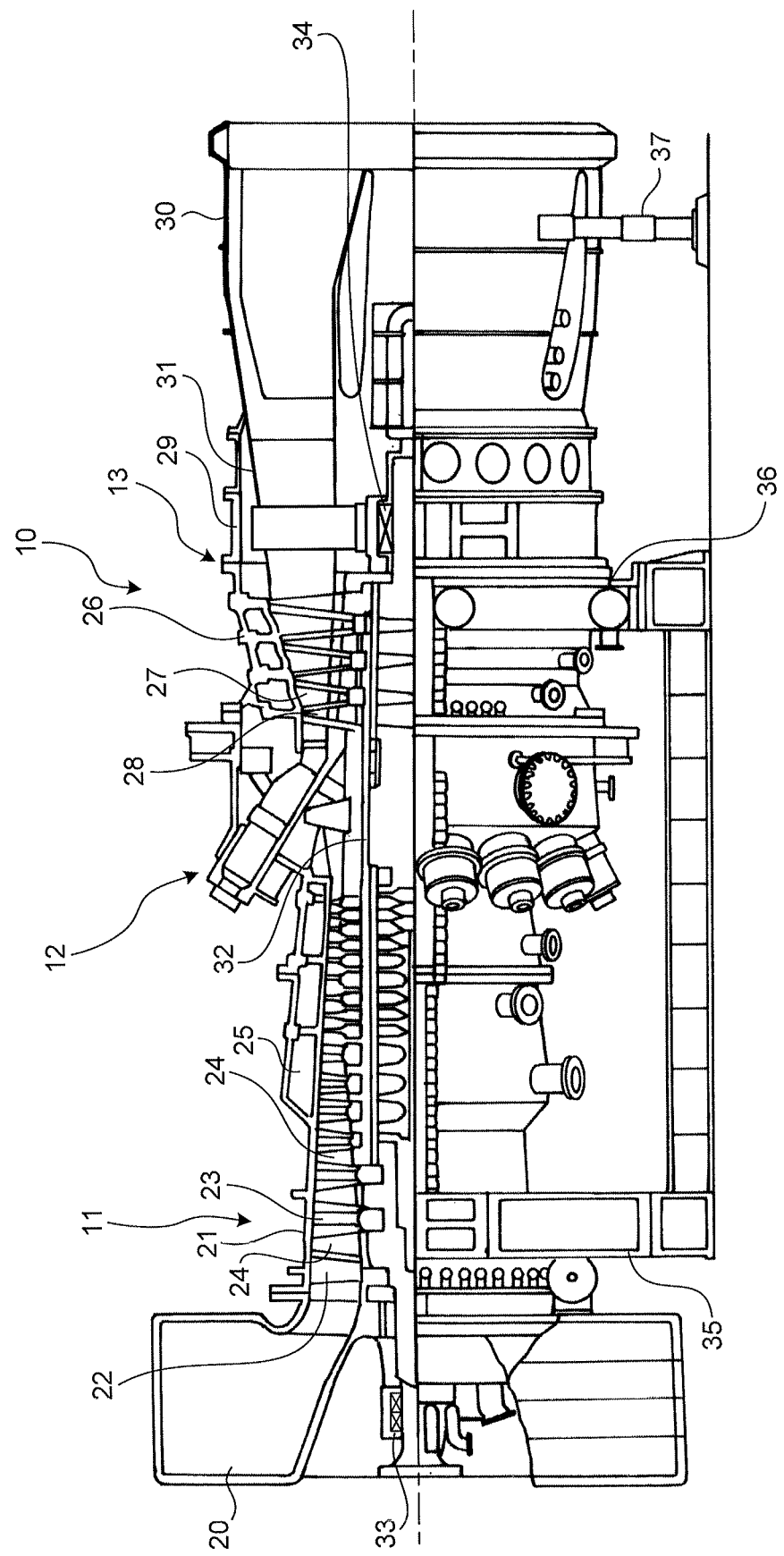
FIG. 1 is a schematic configuration diagram illustrating a gas turbine of a first embodiment.
Figure 2:
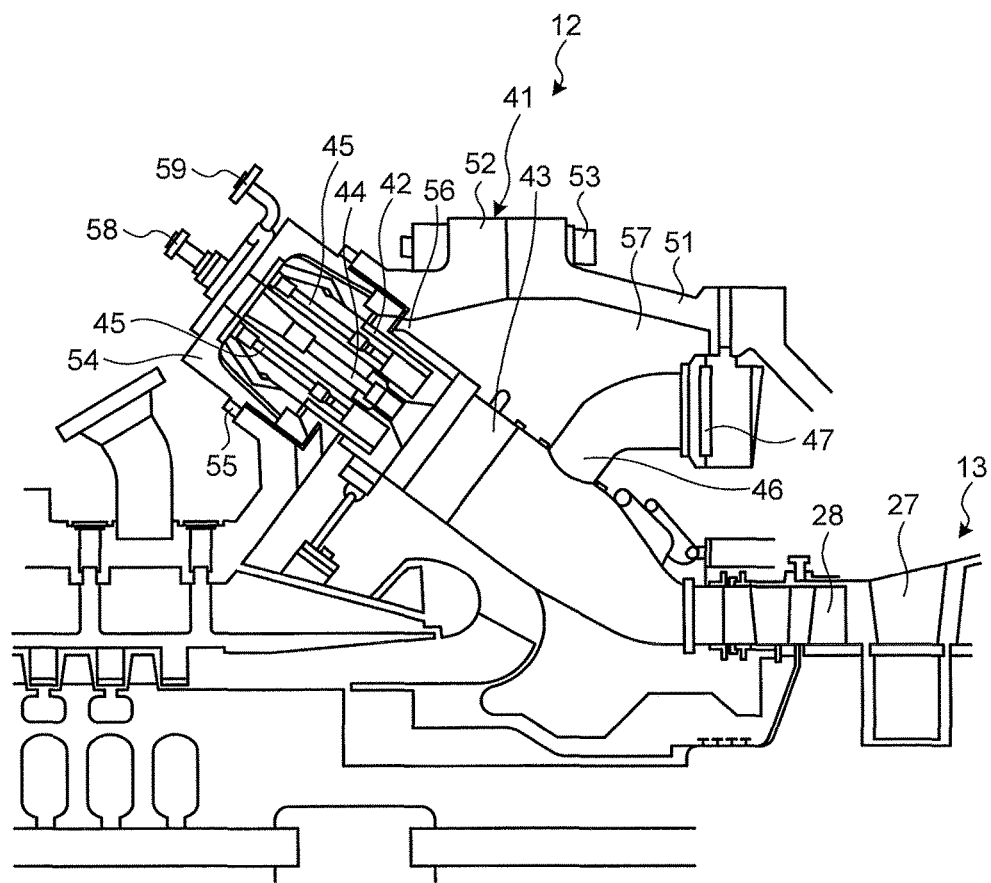
FIG. 2 is a schematic configuration diagram illustrating a combustor of the gas turbine.

FIG. 1 is a schematic configuration diagram illustrating a gas turbine of a first embodiment, and FIG. 2 is a schematic configuration diagram illustrating a combustor of the gas turbine.

In the first embodiment, as illustrated in FIG. 1, a gas turbine 10 is configured from a compressor 11, a combustor (gas turbine combustor) 12, and a turbine 13. The gas turbine 10 is coaxially connected with a generator (not illustrated), and can generate power.

The compressor 11 includes an air inlet 20 that takes in the air. In a compressor casing 21, an inlet guide vane (IGV) 22 is arranged, and a plurality of compressor vanes 23 and compressor blades 24 are alternately arranged in a front-back direction (in an axial direction of a rotor 32 described below) and an air bleed chamber 25 is provide outside the compressor vanes 23 and the compressor blades 24. The combustor 12 can burn by supplying a fuel to compressed air compressed in the compressor 11 and igniting the fuel. The turbine 13 has a plurality of turbine vanes 27 and turbine blades 28 alternately arranged in a turbine casing 26 in the front-back direction (in the axial direction of the rotor 32 described below). The turbine casing 26 has an exhaust chamber 30 arranged at a downstream through an exhaust casing 29. The exhaust chamber 30 includes an exhaust diffuser 31 continuing to the turbine 13.

Further, the rotor (rotating shaft) 32 is arranged to penetrate central portions of the compressor 11, the combustor 12, the turbine 13, and the exhaust chamber 30. While an end portion at the compressor 11 side, of the rotor 32, is rotatably supported by a bearing 33, an end portion at the exhaust chamber 30 side is rotatably supported by a bearing 34. Then, a plurality of disks to which the turbine blades 24 are mounted is stacked and fixed to the rotor 32 in the compressor 11, and a plurality of disks to which the turbine blades 28 are mounted is stacked and fixed to the rotor 32 in the turbine 13.

In this gas turbine, the compressor casing 21 of the compressor 11 is supported by a leg portion 35, a turbine casing 26 of the turbine 13 is supported by a leg portion 36, and the exhaust chamber 30 is supported by a leg portion 37.

Therefore, in the compressor 11, the air taken through the air inlet 20 passes through the inlet guide vane 22, and the plurality of compressor vanes 23 and compressor blades 24, and is compressed, thereby to become high-temperature and high-pressure compressed air. In the combustor 12, a predetermined fuel is supplied to the compressed air and is burned. Then, in the turbine 13, a high-temperature and high-pressure combustion gas, which is a working fluid generated in the combustor 12, passes through the plurality of turbine vanes 27 and turbine blades 28, thereby to drive and rotate the rotor 32, and drives the generator connected to the rotor 32. Meanwhile, the combustion gas passes the exhaust diffuser 31 of the exhaust chamber 30, and is discharged to the atmosphere as a flue gas.

In the combustor 12, as illustrated in FIG. 2, an external cylinder 41 and an inner cylinder 42 positioned inside the external cylinder 41 are arranged at a predetermined interval, and a transition piece 43 is connected to a tip end portion of the inner cylinder 42, so that a combustor casing is configured. The external cylinder 41, the inner cylinder 42, and the transition piece 43 are arranged along a central axis center O. The inner cylinder 42 has a pilot burner 44 positioned and arranged in a central portion inside and a plurality of main burners 45 arranged on an inner peripheral surface to surround the pilot burner 44 along a circumferential direction. The pilot burner 44 and the main burners 45 are arranged in parallel to the central axis center O. The transition piece 43 is connected with a by-pass pipe 46, and the by-pass pipe 46 is provided with a by-pass valve 47.

The external cylinder 41 is configured such that an external cylinder cover portion 52 adheres to a base end portion of an external cylinder body 51 and is fastened with a plurality of fastening bolts 53. In the external cylinder 41, a top hat portion 54 is fit inside the external cylinder cover portion 52 and is fastened with a plurality of fastening bolts 55. The inner cylinder 42 is arranged inside the external cylinder 41 at a predetermined interval. An air passage 56 that forms a cylindrical shape is formed between an inner surface of the top hat portion 54 and an outer surface of the inner cylinder 42. Then, one end portion of the air passage 56 communicates into a supply passage 57 of the compressed air compressed in the compressor 11, and the other end portion of the air passage 56 communicates into the base end portion side in the inner cylinder 42.

In the inner cylinder 42, the pilot burner 44 is positioned and arranged in the central portion, and the plurality of main burners 45 is arranged around the pilot burner 44. Then, the top hat portion 54 is provided with fuel ports 58 and 59. A pilot fuel line (not illustrated) is connected to the pilot fuel port 58, and a main combustion line (not illustrated) is connected to the main fuel ports 59.

Figure 3:
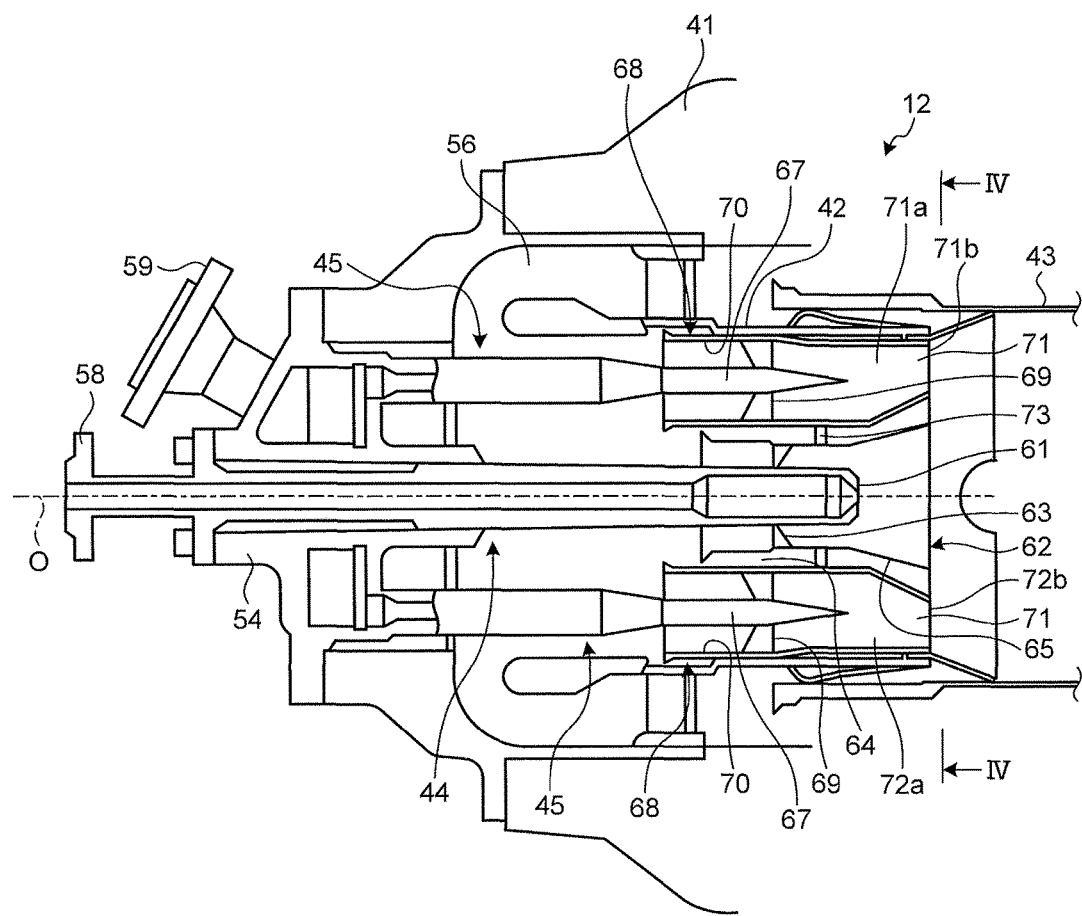
FIG. 3 is a schematic diagram illustrating an internal structure of the combustor.
Figure 5:
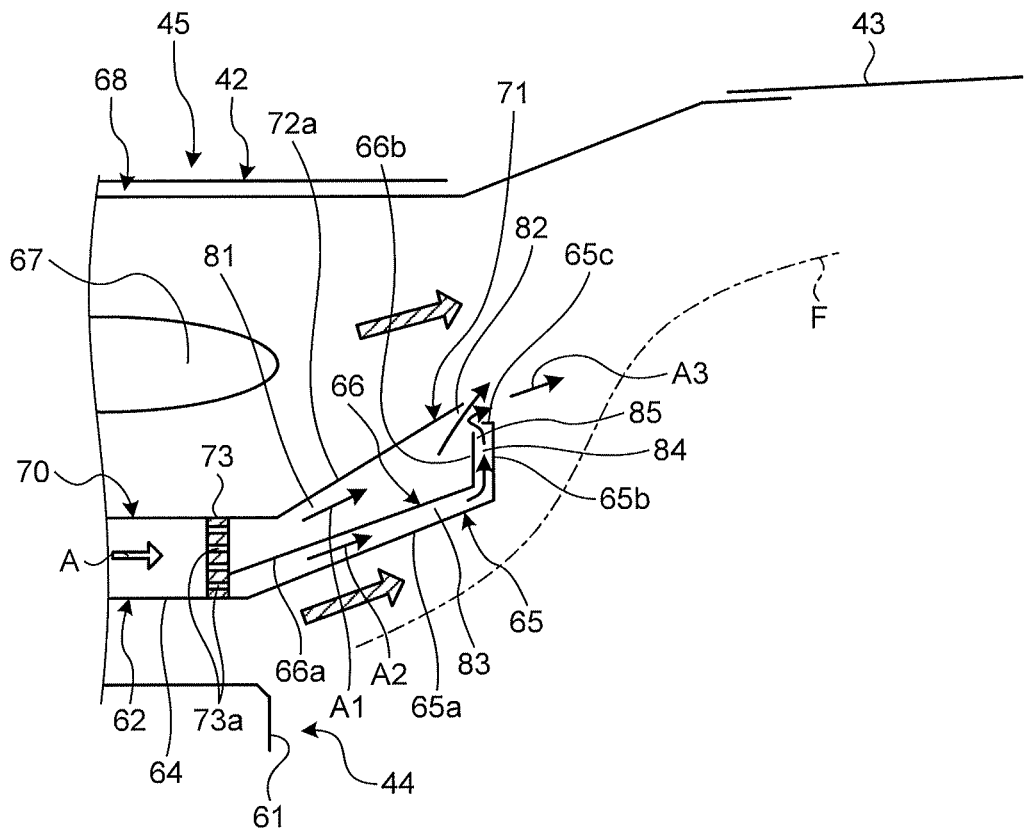
FIG. 5 is a schematic diagram illustrating flows of air-fuel mixture and cooling air.
Figure 6:
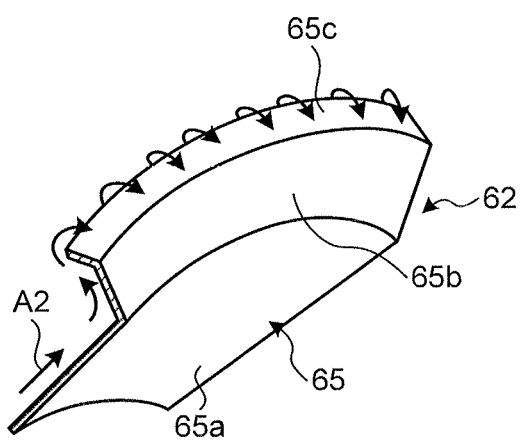
FIG. 6 is an essential portion perspective view of a pilot cone.

Here, the structure of the combustor 12 will be described in detail. FIG. 3 is a schematic diagram illustrating an internal structure of the combustor, FIG. 4 is a IV-IV sectional view of FIG. 3, illustrating an internal structure of the combustor, FIG. 5 is a schematic diagram illustrating flows of air-fuel mixture and cooling air, and FIG. 6 is an essential portion perspective view of a pilot cone.

Figure 4:
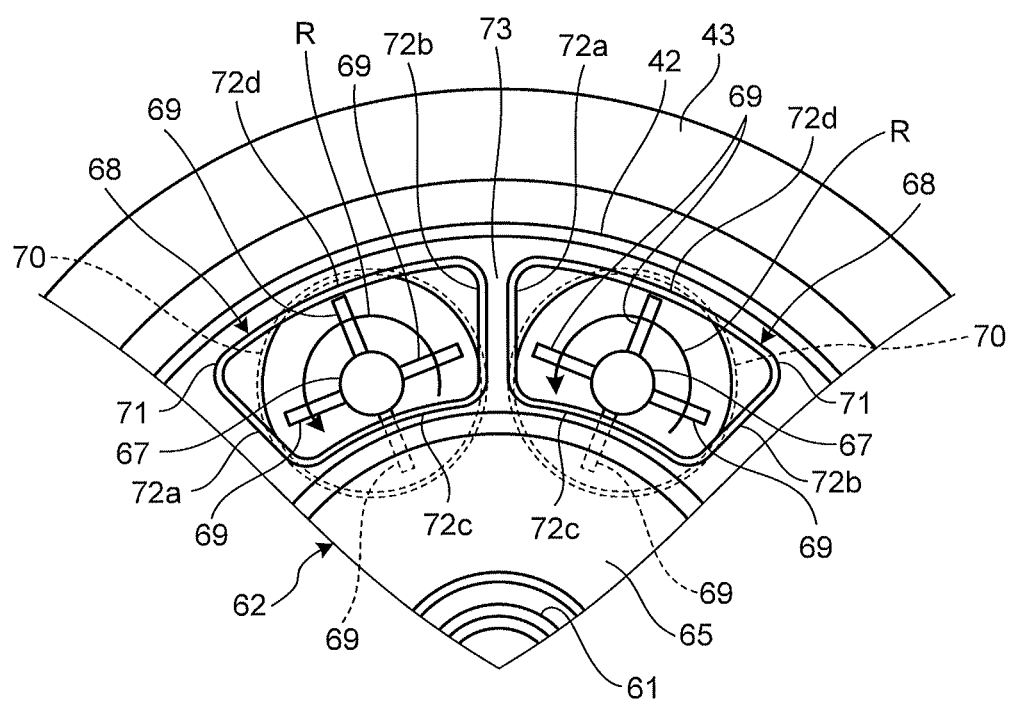
FIG. 4 is an IV-IV sectional view of FIG. 3, illustrating an internal structure of the combustor.

As illustrated in FIGS. 3 and 4, the pilot burner 44 includes a pilot nozzle 61, a pilot cone (flame stabilizer) 62, and a pilot swirler (swirler vane) 63. A base end portion of the pilot nozzle 61 is supported by the top hat portion 54, Hand the pilot fuel port 58 is connected to the pilot nozzle 61. The pilot cone 62 forms a tapered cylinder shape that covers an outside of the pilot nozzle 61, and a tip end portion of the pilot cone 62 radially expands. That is, the pilot cone 62 includes a cone body (flame stabilizer body) 64 having a cylindrical shape, a tapered cylinder portion 65 continuing to a tip end portion side of the cone body 64 and having a tapered cylinder shape, and a tapered external cylinder portion 66 (see FIG. 5) described below, which is arranged outside the tapered cylinder portion 65 with a predetermined space. Then, a tip end portion of the pilot nozzle 61 is arranged inside the pilot cone 62, and a pilot swirler 63 is provided between an outer peripheral surface of the pilot nozzle 61 and an internal peripheral surface of the cone body 64.

The main burner 45 includes a main nozzle 67, a main burner cylinder 68, and a main swirler (swirler vane) 69. A base end portion of the main nozzle 67 is supported by the top hat portion 54, and the main fuel port 59 is connected to the main nozzle 67. The main burner cylinder 68 includes a burner cylinder body 70 having a cylindrical shape, and an extension portion 71 having a rectangular cylinder shape continuing to a tip end portion side of the burner cylinder body 70. Then, a tip end portion of the main nozzle 67 is arranged inside the main burner cylinder 68, and the main swirler 69 is arranged between an outer peripheral surface of the main burner 45 and an inner peripheral surface of the burner cylinder body 70.

In the main burner cylinder 68, the extension portion 71 is continuously and smoothly deformed from an inlet portion 71a having a cylindrical shape into an outlet portion 71b having a rectangular cylinder shape. Then, the outlet portion 71b is formed in a trapezoidal cylinder shape with two radial-direction edges 72a and 72b going along a radial direction around the central axis center O and parallel to each other, and two circumferential-direction edges 72c and 72d going along a circumferential direction around the central axis center O to connect both ends of the radial-direction edges 72a and 72b and parallel to each other.

Then, a substrate 73 is fixed inside the inner cylinder 42, and the pilot cone 62 of the pilot burner 44 and the main burner cylinders 68 of each of the main burners 45 penetrate the substrate 73 and are supported.

Then, the combustor 12 of the present embodiment is provided with a first air ejection portion, a second air ejection portion, and a change member. As illustrated in FIGS. 3 to 5, the pilot burner 44 includes the pilot cone 62. The pilot cone 62 includes the cone body 64, the tapered cylinder portion 65, and the tapered external cylinder portion 66. Meanwhile, the main burner 45 includes the main burner cylinder 68. The main burner cylinder 68 includes the burner cylinder body 70 and the extension portion 71. Then, a tip end portions of the tapered cylinder portion 65 and the tapered external cylinder portion 66 in the pilot cone 62 are arranged along the circumferential-direction edge 72c of the extension portion 71 in the main burner cylinder 68.

The substrate 73 supports the pilot cone 62 and the main burner cylinders 68, and a plurality of vent holes 73a is provided on the substrate 73. The tapered cylinder portion 65 includes a tapered portion 65a having a cylindrical shape, a flange portion 65b provided in a tip end portion of the tapered portion 65a, and an eaves portion 65c provided in a tip end portion of the flange portion 65b. Here, the flange portion 65b is arranged along a radial direction of the pilot cone 62, and the eaves portion 65c is arranged along an axial center direction of the pilot cone 62. The tapered external cylinder portion 66 is positioned outside the tapered cylinder portion 65, and includes a tapered portion 66a having a cylindrical shape, and a flange portion 66b provided in a tip end portion of the tapered portion 66a. The flange portion 65b is arranged along the radial direction of the pilot cone 62.

The first air ejection portion ejects the air toward a tip end portion side between the main burners 45 and the pilot cone 62. That is, the first air ejection portion is configured from an air passage 81 and an air injection port 82, the air passage 81 is provided between an outer peripheral surface of the tapered external cylinder portion 66 in the pilot cone 62 and an outer peripheral surface of the circumferential-direction edge 72c of the extension portion 71 in the main burner cylinder 68. Meanwhile, the second air ejection portion circulates the air toward a tip end portion side outside the pilot cone 62 and ejects the air toward a radially outward direction. That is, the second air ejection portion is configured from a first air passage 83, a second air passage 84, and an air ejection port 85. The first air passage 83 is provided between an outer peripheral surface of the tapered portion 65a in the tapered cylinder portion 65 and an inner peripheral surface of the tapered portion 66a in the tapered external cylinder portion 66 in the pilot cone 62. The second air passage 84 is provided between an outer peripheral surface of the flange portion 65b and an inner peripheral surface of the flange portion 66b.

The first air passage 83 provided outside the pilot cone 62 and circulates the air toward a tip end portion side, the second air passage 84 circulates the air from a tip end portion side of the first air passage 83 toward the outside in the radial direction, and the air ejection port 85 is provided in a tip end portion side of the second air passage 84. The change member changes an ejecting direction of the air ejected through the second air ejection portion to a direction of the central axis center O of the pilot cone 62, and is provided in the air ejection port 85, as illustrated in detail in FIG. 6. That is, the change member is configured from the eaves portion 65c of the tapered cylinder portion 65. The eaves portion 65c extends from the tip end portion of the flange portion 65b along the tip end portion side of the flange portion 66b.

Therefore, as illustrated in FIG. 5, after compressed air A introduced into the inner cylinder 42 passes through the vent holes 73a of the substrate 73, the compressed air A is divided into the air passage 81 and the first air passage 83. Then, air A1 in the air passage 81 is ejected through the air ejection port 82. Air A2 of the first air passage 83 passes the second air passage 84 and cools the pilot cone 62, and is then ejected through the air ejection port 85. At this time, the ejecting direction of the air A2 ejected through the air ejection port 85 is changed by the eaves portion 65c toward the air A1 ejected through the air ejection port 82. To be specific, the ejecting direction of the air A2 ejected through the air ejection port 85 is changed to become an opposite direction to the ejecting direction of the air A1 ejected through the air ejection port 82.

Then, the air A1 ejected through the air ejection port 82 is ejected at an upstream side of the transition piece 43, and outside in the radial direction. The air A2 ejected through the air ejection port 85 is ejected toward the air A1, so that both of the air A1 and the air A2 are cancelled in components flowing outside in the radial direction, and air A3 is more likely to flow into the downstream side of the transition piece 43. The air A3 interferes with a flame surface F. Therefore, the position of the flame surface is moved by the change of the flow of the air A3.

Figure 7A:
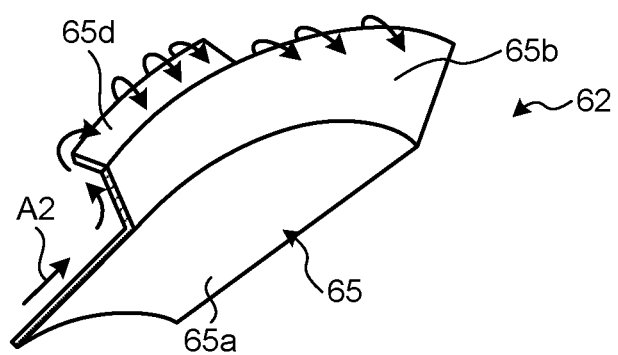
FIG. 7A is an essential portion perspective view illustrating a modification of a pilot cone.
Figure 7B:
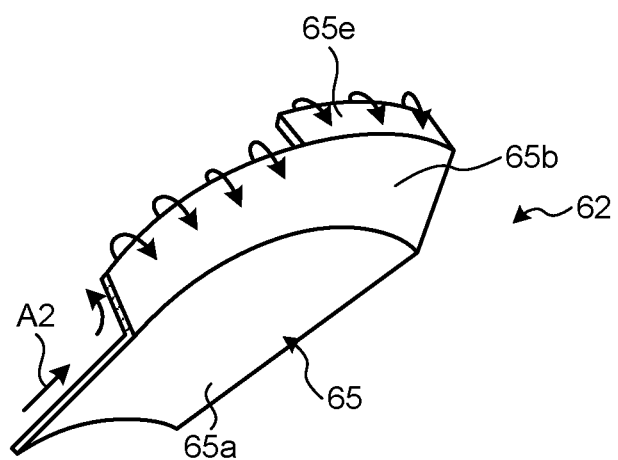
FIG. 7B is an essential portion perspective view illustrating a modification of a pilot cone.

The Eaves portion 65c as the change member provided in the tapered cylinder portion 65 of the pilot cone 62 is provided in the entire area facing the circumferential-direction edge 72c of the extension portion 71 in the main burner cylinder 68. Note that the position of the eaves portion 65c is not limited to this configuration. FIGS. 7A and 7B are essential portion perspective views illustrating modifications of the pilot cone.

As illustrated in FIG. 7A, an eaves portion 65d as the change member is provided in a partial area facing the circumferential-direction edge 72c of the extension portion 71 in the main burner cylinder 68. Further, as illustrated in FIG. 7B, an eaves portion 65e as the change member is provided in a partial area facing the circumferential-direction edge 72c of the extension portion 71 in the main burner cylinder 68. Here, as illustrated in FIG. 4, air-fuel mixture ejected from the main burners 45 is a swirl flow R. Therefore, an outflow angle in the downstream direction, of the flow of the air A3, can be controlled according to the change member position installation place, like the eaves portion 65d of FIG. 7A and the eaves portion 65e of FIG. 7B. According to this control, an interference ratio of the air A3 to the flame surface is changed, and the flame position can be adjusted backward and forward.

In such a combustor 12 of the gas turbine 10, when the high-temperature and high-pressure compressed air flows into the air passage 56, as illustrated in FIG. 3, the air is reversed and introduced into the pilot cone 62 of the pilot burner 44 and the main burner cylinders 68 of the main burners 45. The compressed air A then, in the main burners 45, becomes an air flow swirling in the main burner cylinders 68 by the main swirlers 69, is mixed with the fuel injected through the main nozzles 67 therein, becomes pre-air-fuel mixture, and flows into the transition piece 43. Further, in the pilot burner 44, the compressed air A becomes an air flow swirling in the pilot cone 62 by the pilot swirler 63, is mixed with the fuel injected through the pilot nozzle 61, is ignited by pilot light (not illustrated) and burned, becomes a combustion gas, and is ejected into the transition piece 43. At this time, a part of the combustion gas is ejected into the transition piece 43 to be diffused around with flame, so that the pre-air-fuel mixture flowing from the main burners 45 into the transition piece 43 catches fire and is burned, whereby the flame surface F (see FIG. 5) is herein formed.

That is, flame stabilization for performing stable combustion of lean premixed fuel from the main burners 45 can be performed with the diffusion flame of the pilot fuel injected from the pilot burner 44. Further, the fuel is pre-mixed by the main burners 45, so that the fuel concentration can be made uniform and NOx reduction can be achieved. At this time, the inside of the main burner cylinder 68 of the main burner 45 becomes a premix area, and the area where the pre-air-fuel mixture is burned by the diffusion flame from the pilot burner 44 becomes a combustion area. The combustion area is at a downstream of the pilot cone 62, and exists inside the transition piece 43. Therefore, the combustion gas burned by the pre-air-fuel mixture flows inside the transition piece 43.

Further, as illustrated in FIG. 5, the compressed air A introduced into the inner cylinder 42 passes through the vent holes 73a of the substrate 73, and is then divided into the air passage 81 and the first air passage 83. The air A1 in the air passage 81 is ejected through the air ejection port 82, and the air A2 in the first air passage 83 passes through the second air passage 84, and is ejected through the air ejection port 85. At this time, the air A2 ejected through the air ejection port 85 is injected by the eaves portion 65c toward the air A1 ejected through the air ejection port 82. Then, the air A1 ejected through the air ejection port 82 and the air A2 ejected through the air ejection port 85 collide with each other, and the air A3 that is integrated air A1 and A2, flows into the downstream side of the transition piece 43. In this case, the position of the flame surface F is moved backward and forward according to the arranged position of the eaves portion 65c. Therefore, an optimum position of the flame surface F according to a combustion form of the combustor 12 can be obtained.

As described above, in the gas turbine combustor of the first embodiment, the pilot burner 44, the plurality of main burners 45, and the pilot cone 62 are provided. The gas turbine combustor includes the air passage (first air ejection portion) 81 that ejects the air toward the tip end portion side outside the main burners 45, the air passages (second air ejection portion) 83 and 84 that circulates the air toward the tip end portion side outside the pilot cone 62 and ejects the air toward an outside in the radial direction, and the eaves portion (change member) 65c that changes the ejecting direction of the air ejected through the air passages 83 and 84 to the central axis center O direction of the pilot cone 62.

Therefore, the air in the air passage 81 is ejected through the air injection port 82 toward the tip end portion side outside the main burners 45, the air in the air passages 83 and 84 is ejected through the air injection port 85 toward the outside of the pilot cone 62, and the eaves portion 65c changes the ejecting direction of the air ejected through the air injection port 85 to the central axis center O direction of the pilot cone 62. That is, the position in a front-back direction of the flame surface F formed such that the air-fuel mixture from the main burners 45 is ignited by the diffusion flame of the pilot burner 44 has the optimum position according to the combustion form of the combustor 12. Then, the position of the flame surface F is moved backward and forward according to the air flow through the air injection port 82. Therefore, the air flow through the air injection port 82 is changed by the air flow through the air injection port 85, the injecting direction of which has been changed by the eaves portion 65c, so that the position in a front-back direction of the flame surface F can be adjusted to the optimum position. As a result, the position of the flame is controlled to an appropriate position, and the combustion can be stabilized and a combustion oscillation can be suppressed.

In the gas turbine combustor of the first embodiment, the first air passage 83 that is provided outside the pilot cone 62 and circulates the air toward the tip end portion side, the second air passage 84 that circulates the air from the tip end portion side of the first air passage 83 toward an outside in the radial direction, and the air ejection port 85 provided in the tip end portion side of the second air passage 84, and the eaves portion 65c is provided in the air ejection port 85. Therefore, the direction of the air flow ejected through the air ejection port 85 can be easily changed, and the structure can be simplified.

In the gas turbine combustor of the first embodiment, the pilot cone 62 is configured from the cone body 64 having a cylindrical shape, the tapered cylinder portion 65 having a tapered cylinder shape and continuing to the tip end portion side of the cone body 64, and the tapered external cylinder portion 66 arranged outside the tapered cylinder portion 65 with a predetermined space. The eaves portion 65c is provided in the air ejection port 85 of the tapered cylinder portion 65. Therefore, the direction of the air flow ejected through the air ejection port 85 can be easily changed to one side or the other side of the central axis center O direction of the pilot cone 62.

In the gas turbine combustor of the first embodiment, the eaves portion 65c is provided in the tip end portion of the tapered cylinder portion 65, and the ejecting direction of the air ejected through the air ejection port 85 is changed toward the air ejected through the air ejection port 82. Therefore, the direction of the air flow ejected through the air ejection port 82 can be easily and properly changed.

In the gas turbine combustor of the first embodiment, the ejecting direction of the air ejected through the air ejection port 85 is changed by the eaves portion 65c to become the opposite direction of the ejecting direction of the air ejected through the air ejection port 82. Therefore, energy of the air flow ejected through the air ejection port 82 can be easily adjusted, and the direction can be properly changed.

In the gas turbine combustor of the first embodiment, the eaves portion 65c as the change member is provided in the entire area facing the main burner cylinder 68. Therefore, the position in a front-back direction of the flame surface F formed such that the air-fuel mixture from the main burners 45 is ignited by the diffusion flame of the pilot burner 44 can be adjusted to an appropriate position according to the combustion form of the combustor 12.

In the gas turbine combustor of the first embodiment, the eaves portions 65d and 65e as the change members are provided in partial areas facing the main burner cylinder 68. Therefore, the position in a front-back direction of the flame surface F formed such that the air-fuel mixture from the main burners 45 is ignited by the diffusion flame of the pilot burner 44 can be adjusted to an appropriate position according to the combustion form of the combustor 12.

Further, the gas turbine of the first embodiment is configured from the compressor 11, the combustor 12, and the turbine 13, and the combustor 12 is provided with the air passage (first air ejection portion) 81, the air passages (second air ejection portion) 83 and 84, and the eaves portion (change member) 65c. Therefore, the position of the flame is controlled to an appropriate position, so that combustion can be stabilized and the performance can be improved.

[Second Embodiment]

Figure 8:
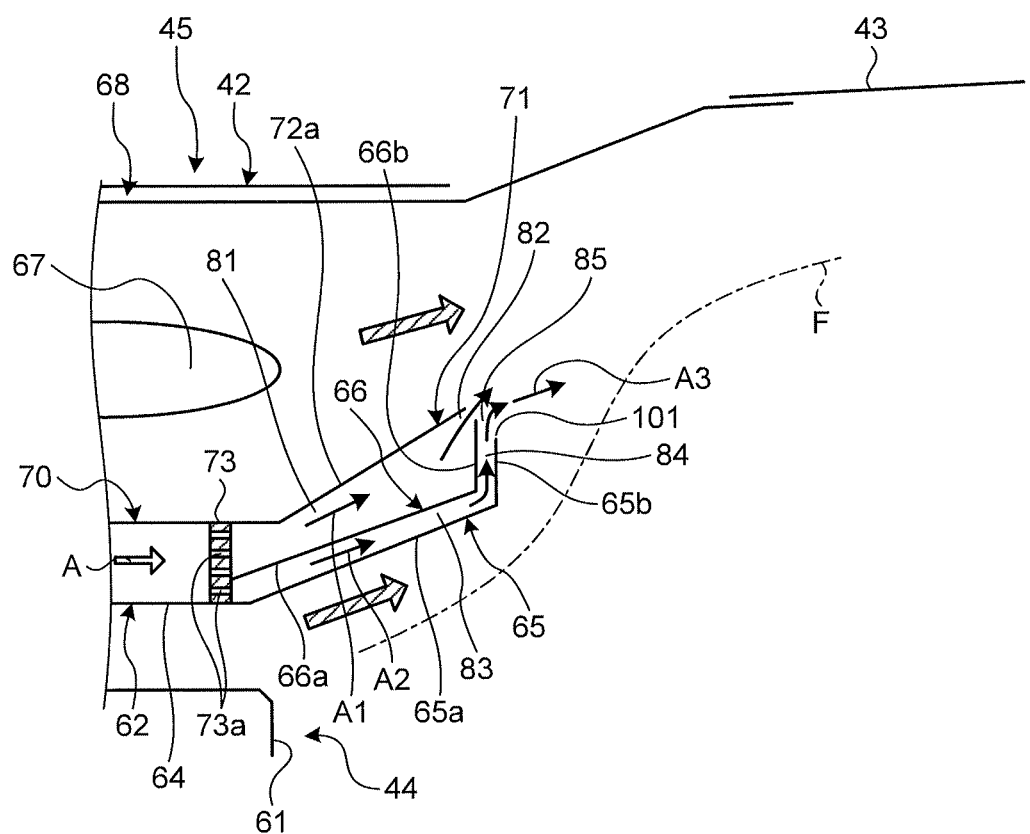
FIG. 8 is a schematic diagram illustrating a combustor of a gas turbine according to a second embodiment.

FIG. 8 is a schematic diagram illustrating a combustor of a gas turbine according to a second embodiment. Note that members having a similar function to those in the above-described embodiment are denoted with the same reference signs, and detailed description is omitted.

In a gas turbine combustor of the second embodiment, as illustrated in FIG. 8, a pilot burner 44 includes a pilot nozzle 61, a pilot cone 62, and a pilot swirler 63. The pilot cone 62 includes a cone body 64, a tapered cylinder portion 65, and a tapered external cylinder portion 66. The main burner 45 includes a main nozzle 67, a main burner cylinder 68, and a main swirler 69. The main burner cylinder 68 includes a burner cylinder body 70 and an extension portion 71. The extension portion 71 is continuously and smoothly deformed form an inlet portion 71a having a cylindrical shape to an outlet portion 71b having a rectangular cylinder shape, and the outlet portion 71b is formed in a trapezoidal cylinder shape with two radial-direction edges 72a and 72b and two circumferential-direction edges 72c and 72d.

Then, a combustor 12 of the present embodiment is provided with a first air ejection portion, a second air ejection portion, and a change member. The tapered cylinder portion 65 includes a tapered portion 65a having a cylindrical shape, a flange portion 65b provided in a tip end portion of the tapered portion 65a, and a cutout portion 101 provided in a tip end portion of the flange portion 65b. The tapered external cylinder portion 66 is positioned outside the tapered cylinder portion 65, and includes a tapered portion 66a having a cylindrical shape and a flange portion 66b provided in a tip end portion of the tapered portion 66a.

As the first air ejection portion, an air passage 81 and an injection port 82 are provided. Meanwhile, as the second air ejection portion, a first air passage 83, a second air passage 84, and an air injection port 85 are provided. The change member changes an ejecting direction of the air ejected through the air ejection port 85 to a direction of a central axis center O of the pilot cone 62, and is provided in the air ejection port 85. That is, the change member is configured from the cutout portion 101 of the tapered cylinder portion 65. This cutout portion 101 is configured such that the tip end portion of the flange portion 65b is cut out, and the tip end portion of the flange portion 65b is positioned inside in a radial direction with respect to the tip end portion of the flange portion 66b. Therefore, the air ejection port 85 is open at a downstream side in the flow direction of the air, and the ejecting direction of the air ejected through the air ejection port 85 is changed to become the same direction of the ejecting direction of the air ejected through the air ejection port 82.

Therefore, compressed air A introduced into an inner cylinder 42 passes through vent holes 73a of a substrate 73, and is then divided into the air passage 81 and the first air passage 83. Air A1 in the air passage 81 is ejected through the air ejection port 82, and air A2 in the first air passage 83 passes through the second air passage 84 and cools the pilot cone 62, and is then ejected through the air ejection port 85. At this time, the ejecting direction of the air A2 ejected through the air ejection port 85 is changed by the cutout portion 101 to become the same direction as the ejecting direction of the air A1 ejected through the air ejection port 82.

Then, the air A1 ejected through the air ejection port 82 is integrated with the air A2 ejected through the air ejection port 85, and air A3 is more likely to flow into a downstream side of a transition piece 43. Therefore, a flame surface F is moved to the downstream side by the flow of the air A3.

As described above, in the gas turbine combustor of the second embodiment, the cutout portion 101 is provided in the tip end portion of the tapered cylinder portion 65 as the change member, and the ejecting direction of the air ejected through the air ejection port 85 is changed to become the same direction as the ejecting direction of the air injected through the air ejection port 82.

Therefore, the air flow ejected through the air ejection port 85 becomes the same direction as the air flow ejected through the air ejection port 82 by the cutout portion 101, so that energy of the air flow ejected through the air ejection port 82 can be easily adjusted and the direction can be property changed.

[Third Embodiment]

Figure 9:
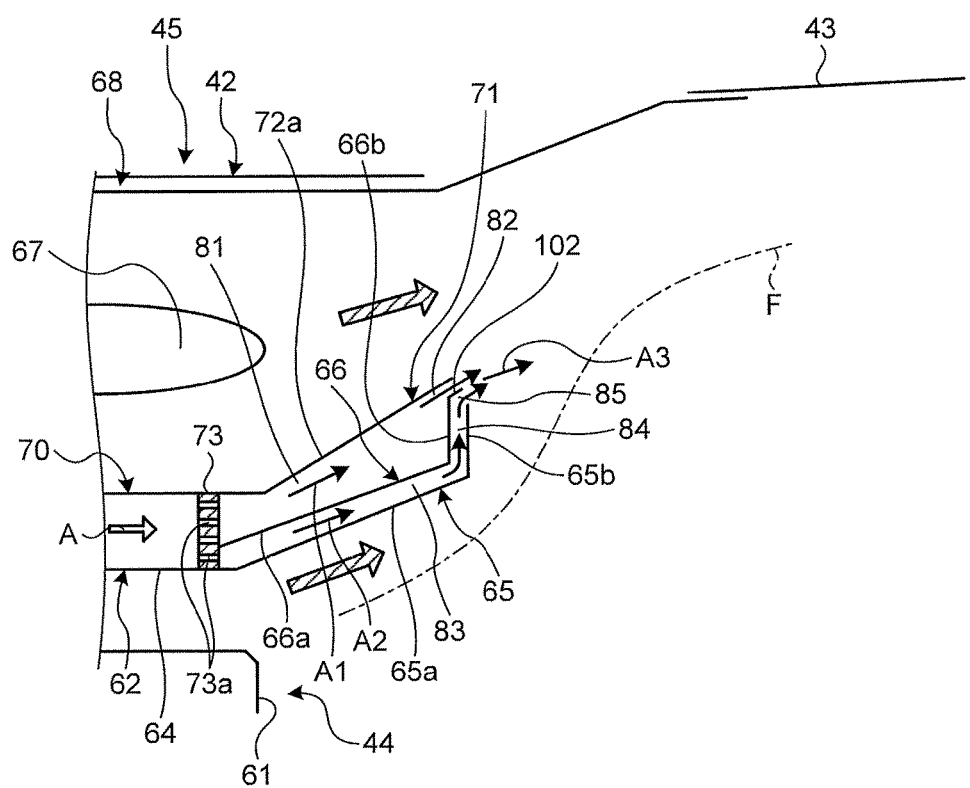
FIG. 9 is a schematic diagram illustrating a combustor of a gas turbine according to a third embodiment.

FIG. 9 is a schematic diagram illustrating a combustor of a gas turbine according to a third embodiment. Note that members having a similar function to those in the above-described embodiments are denoted with the same reference signs, and detailed description is omitted.

In a gas turbine combustor of the third embodiment, as illustrated in FIG. 9, a pilot burner 44 includes a pilot nozzle 61, a pilot cone 62, and a pilot swirler 63. The pilot cone 62 includes a cone body 64, a tapered cylinder portion 65, and a tapered external cylinder portion 66. A main burner 45 includes a main nozzle 67, a main burner cylinder 68, and a main swirler 69. The main burner cylinder 68 includes a burner cylinder body 70 and an extension portion 71. The extension portion 71 is continuously and smoothly deformed from an inlet portion 71a having a cylindrical shape to an outlet portion 71b having a rectangular cylinder shape, and the outlet portion 71b is formed in a trapezoidal cylinder shape with two radial-direction edges 72a and 72b and two circumferential-direction edges 72c and 72d.

A combustor 12 of the present embodiment is provided with a first air ejection portion, a second air ejection portion, and a change member. The tapered cylinder portion 65 includes a tapered portion 65a having a cylindrical shape, and a flange portion 65b provided in a tip end portion of the tapered portion 65a. The tapered external cylinder portion 66 includes a tapered portion 66a positioned outside the tapered cylinder portion 65, and having a cylindrical shape, a flange portion 66b provided in a tip end portion of the tapered portion 66a, and an eaves portion 102 provided in a tip end portion of the flange portion 66b. Here, the flange portion 66b is arranged along a radial direction of the pilot cone 62, and the eaves portion 102 is arranged along an axial center direction of the pilot cone 62.

As the first air ejection portion, an air passage 81 and an air injection port 82 are provided. Meanwhile, as the second air ejection portion, a first air passage 83, a second air passage 84, and an air injection port 85 are provided. The change member changes an ejecting direction of the air ejected through the air ejection port 85 to a direction of a central axis center O of the pilot cone 62, and is provided in the air ejection port 85. That is, the change member is configured from the eaves portion 102 of the tapered cylinder portion 65. This eaves portion 102 extends from the tip end portion of the flange portion 66b to a tip end portion side of the flange portion 65b.

Therefore, compressed air A introduced into an inner cylinder 42 passes through vent holes 73a of a substrate 73, and is then divided into the air passage 81 and the first air passage 83. Air A1 in the air passage 81 is ejected through the air ejection port 82, and air A2 in the first air passage 83 passes through the second air passage 84 and cools the pilot cone 62, and is then ejected through the air ejection port 85. At this time, the ejecting direction of the air A2 ejected through the air ejection port 85 is changed by the eaves portion 102 to become the same direction as the ejecting direction of the air A1 ejected through the air ejection port 82.

Then, the air A1 ejected through the air ejection port 82 is integrated with the air A2 ejected through the air ejection port 85, and air A3 is more likely to flow into a downstream side of a transition piece 43. Therefore, a flame surface F is moved to the downstream side by the flow of the air A3.

As described above, in the gas turbine combustor of the third embodiment, the eaves portion 102 is provided in the tip end portion of the tapered cylinder portion 65 as the change member, and the ejecting direction of the air ejected through the air ejection port 85 is changed to become the same direction as the ejecting direction of the air injected through the air ejection port 82.

Therefore, the air flow ejected through the air ejection port 85 has the same direction as the air flow ejected through the air ejection port 82 by the eaves portion 101, so that energy of the air flow ejected through the air ejection port 82 can be easily adjusted and the direction can be properly changed.

[Fourth Embodiment]

Figure 10:
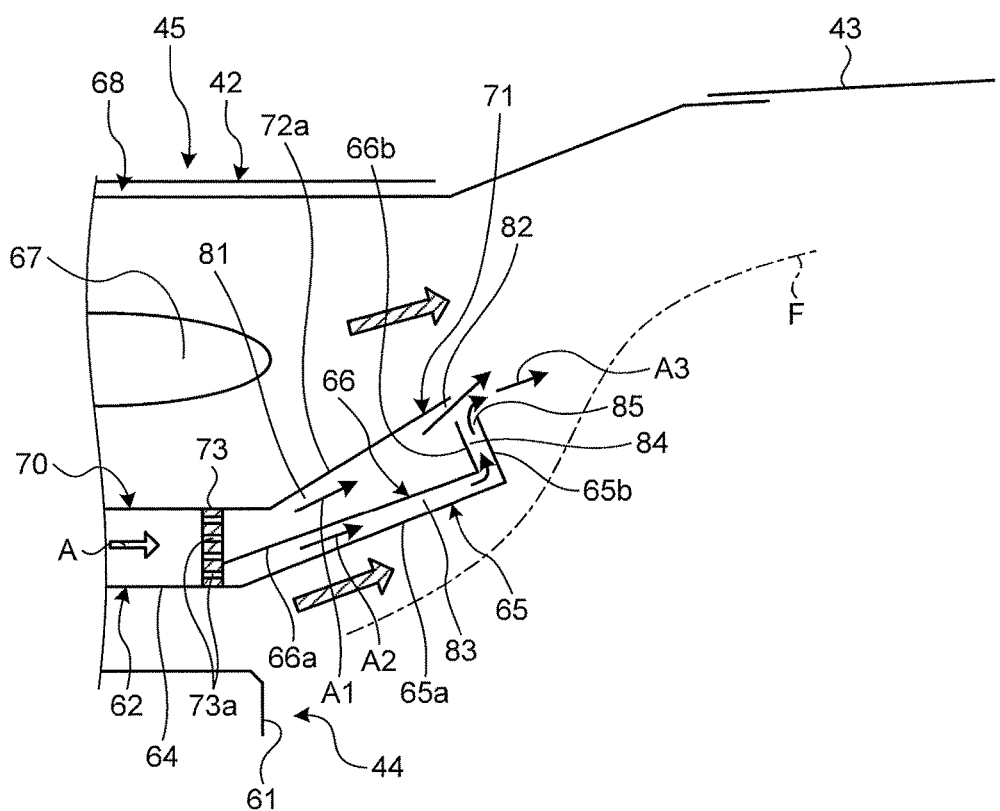
FIG. 10 is a schematic diagram illustrating a combustor of a gas turbine according to a fourth embodiment.

FIG. 10 is a schematic diagram illustrating a combustor of a gas turbine according to a fourth embodiment. Note that members having a similar function to those in the above-described embodiments are denoted with the same reference signs, and detailed description is omitted.

In a gas turbine combustor of the fourth embodiment, as illustrated in FIG. 10, a pilot burner 44 includes a pilot nozzle 61, a pilot cone 62, and a pilot swirler 63. The pilot cone 62 includes a cone body 64, a tapered cylinder portion 65, and a tapered external cylinder portion 66. The main burner 45 includes a main nozzle 67, a main burner cylinder 68, and a main swirler 69. The main burner cylinder 68 includes a burner cylinder body 70 and an extension portion 71. The extension portion 71 is continuously and smoothly deformed from an inlet portion 71a having a cylindrical shape to an outlet portion 71b having a rectangular cylinder, and the outlet portion 71b is formed in a trapezoidal cylinder shape with two radial-direction edges 72a and 72b and two circumferential-direction edges 72c and 72d.

Then, a combustor 12 of the preset embodiment is provided with a first air ejection portion and a second air ejection portion. The tapered cylinder portion 65 includes a tapered portion 65a having a cylindrical shape and a flange portion 65b provided in a tip end portion of the tapered portion 65a. Here, the flange portion 65b goes along a radial direction of the pilot cone 62, and is arranged such that a tip end portion thereof is inclined toward a base end portion side of the pilot cone 62 in an axial direction. The tapered external cylinder portion 66 is positioned outside the tapered cylinder portion 65, and includes a tapered portion 66a having a cylindrical shape and a flange portion 66b provided in a tip end portion of the tapered portion 66a. Here, the flange portion 66b goes along the radial direction of the pilot cone 62 and is arranged such that a tip end portion thereof is inclined toward the base end portion side of the pilot cone 62 in the axial direction.

As the first air ejection portion, an air passage 81 and an air injection port 82 are provided. Meanwhile, as the second air ejection portion, a first air passage 83, a second air passage 84, and an air injection port 85 are provided. Here, the first air passage 83 allows the air to flow toward the tip end portion side in a central axis center O direction of the pilot cone 62, and the second air passage 84 allows the air to flow toward an outside in the radial direction of the pilot cone 62, and inclined to the base end portion side of the axial direction of the pilot cone 62.

Therefore, compressed air A introduced into an inner cylinder 42 passes through vent holes 73a of a substrate 73, and is then divided into the air passage 81 and the first air passage 83. Then, air A1 in the air passage 81 is ejected through the air ejection port 82, and air A2 in the first air passage 83 passes through the second air passage 84 and cools the pilot cone 62, and is then ejected through the air ejection port 85. At this time, since the second air passage 84 is inclined to an upstream side in a flowing direction of the air A2, the air A2 ejected through the air ejection port 85 is ejected toward the A1 ejected through the air ejection port 82.

Then, the air A1 ejected through the air ejection port 82 is ejected to a downstream side of a transition piece 43, and outside in the radial direction. The air A2 ejected through the air ejection port 85 is ejected toward the air A1, so that both of the air A1 and air A2 are cancelled in components flowing outside in the radial direction, and air A3 is more likely to flow into the downstream side of the transition piece 43. Therefore, a flame surface F is moved to the downstream side by the flow of the air A3.

In the gas turbine combustor of the fourth embodiment, the air passage (first air ejection portion) 81 that ejects the air toward the tip end portion side outside the main burner 45, and the air passages (second air ejection portion) 83 and 84 that circulate the air toward the tip end portion side outside the pilot cone 62 and eject the air toward an outside in the radial direction are provided, and the second air passage 84 is provided inclined to the upstream side in a flowing direction of the air.

Therefore, the direction of the air flow through the air injection port 82 is hanged by the air flow through the air injection port 85 of the second air passage 84, so that the position in a front-back direction of the flame surface F can be adjusted to an optimum position. As a result, the position of the flame is controlled to an appropriate position, and combustion can be stabilized and a combustion oscillation can be controlled.

[Fifth Embodiment]

Figure 11:
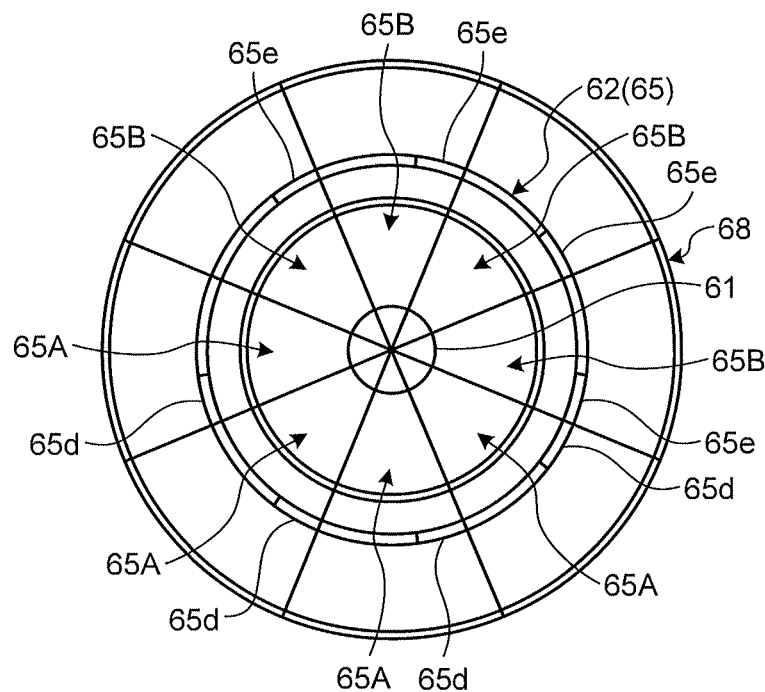
FIG. 11 is a schematic diagram illustrating a combustor of a gas turbine according to a fifth embodiment.

FIG. 11 is a schematic diagram illustrating a combustor of a gas turbine according to a fifth embodiment. Note that members having a similar function to those in the above-described embodiments are denoted with the same reference signs, and detailed description is omitted.

In a combustor of a gas turbine of the fifth embodiment, as illustrated in FIG. 11, a pilot cone 62 includes a tapered cylinder portion 65. The tapered cylinder portion 65 is configured such that a plurality of (eight, in the present embodiment) tapered cylinder portion divided bodies 65A and 65B are combined in a cylindrical shape. In this case, the tapered cylinder portion divided body 65A is provided with an eaves portion 65d as a change member in an area at one side in a circumferential direction in a main burner cylinder 68, and the tapered cylinder portion divided body 65B is provided with an eaves portion 65e as a change member in an area at the other side in the circumferential direction in the main burner cylinder 68. That is, the tapered cylinder portion 65 is configured such that the four tapered cylinder portion divided bodies 65A and the four tapered cylinder portion divided bodies 65B are combined in a cylindrical shape. Therefore, the eaves portions 65d and 65e can be provided in desired areas in the tapered cylinder portion 65. Note that the combination, the order, or the positions in the circumferential direction in the tapered cylinder portion divided bodies 65A and 65B are not limited to those described above.

[Sixth Embodiment]

Figure 12:
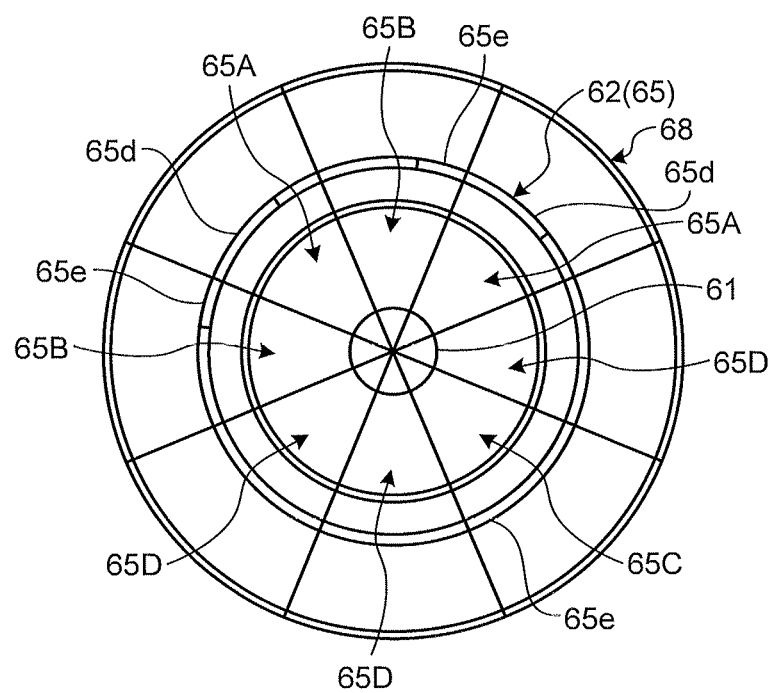
FIG. 12 is a schematic diagram illustrating a combustor of a gas turbine according to a sixth embodiment.

FIG. 12 is a schematic diagram illustrating a combustor of a gas turbine according to a sixth embodiment. Note that members having a similar function to those in the above-described embodiments are denoted with the same reference signs, and detailed description is omitted.

In a combustor of a gas turbine of the sixth embodiment, as illustrated in FIG. 12, a pilot cone 62 includes a tapered cylinder portion 65. The tapered cylinder portion 65 is configured such that a plurality of (eight in the present embodiment) tapered cylinder portion divided bodies 65A, 65B, 65C, and 65D are combined in a cylindrical shape. In this case, the tapered cylinder portion divided body 65A is provided with an eaves portion 65d as a change member in an area at one side in a circumferential direction in the main burner cylinder 68, and the tapered cylinder portion divided body 65B is provided with an eaves portion 65e as a change member in an area at the other side in the circumferential direction in the main burner cylinder 68. Further, the tapered cylinder portion divided body 65C is provided with an eaves portion 65c as a change member in the entire area in the circumferential direction in the main burner cylinder 68, and the tapered cylinder portion divided body 65D is not provided with an eaves portion as a change member. That is, the tapered cylinder portion 65 is configured such that the plurality of types of tapered cylinder portion divided bodies 65A, 65B, 65C, and 65D are combined in a cylindrical shape. Therefore, the eaves portions 65c, 65d, and 65e can be provided in desired areas in the tapered cylinder portion 65. Note that the combination, the order, and the positions in the circumferential direction in the tapered cylinder portion divided bodies 65A, 65B, 65C, and 65D are not limited to those described above.

Note that, in the above embodiments, as the change member of the present invention, the eaves portions and the cutout portion have been employed. However, an embodiment is not limited to these configurations, and any member can be employed as long as the member changes the ejecting direction of the air ejected through the second air ejection portion to the axial center direction of the flame stabilizer. In this case, the change member may be integrally provided with the second air ejection portion, or may be provided as a separate member.

REFERENCE SIGNS LIST

10 Gas turbine
11 Compressor
12 Combustor
13 Turbine
21 Compressor casing
22 Inlet guide vane
23 Compressor vane
24 Compressor blade
25 Air bleed chamber
26 Turbine casing
27 Turbine vane
28 Turbine blade
29 Exhaust casing
30 Exhaust chamber
31 Exhaust diffuser
32 Rotor
33 and 34 Bearing
35, 36, and 37 Leg portion
41 External cylinder (combustion chamber)
42 Inner cylinder (combustion chamber)
43 Transition piece (combustion chamber)
44 Pilot burner
45 Main burner
46 By-pass pipe
47 By-pass valve
51 External cylinder body
52 External cylinder cover portion
53 Fastening bolt
54 Top hat portion
55 Fastening bolt
56 Air passage
57 Supply passage
58 Pilot fuel port
59 Main fuel port
61 Pilot nozzle
62 Pilot cone (flame stabilizer)
63 Pilot swirler (swirler vane)
64 Cone body (flame stabilizer body)
65 Tapered cylinder portion
65a Tapered portion
65b Flange portion
65c, 65d, and 65e Eaves portion (change member)
64A, 65B, and 65C Tapered cylinder portion divided body
66 Tapered external cylinder portion
66a Tapered portion
66b Flange portion
67 Main nozzle
68 Main burner cylinder 69 Main swirler (swirler vane)
70 Burner cylinder body
71 Extension portion
71a Inlet portion
71b Outlet portion
72a and 72b Radial-direction edge
72c and 72d Circumferential-direction edge
73 Substrate
73a Vent hole
81 Air passage (first air ejection portion)
82 Air injection port
83 First air passage (second air ejection portion)
84 Second air passage (second air ejection portion)
85 Air ejection port
101 Cutout portion (change member)
102 Eaves portion (change member)
A, A1, A2, and A3 Air
O Central axis center
R Swirl flow

The invention claimed is:

1. A gas turbine combustor comprising:
a combustion chamber having a cylindrical shape;
a pilot burner in a central portion in the combustion chamber;
a plurality of main burners around the pilot burner in the combustion chamber;
a flame stabilizer covering an outside of a pilot nozzle in the pilot burner and having a tapered cylinder shape where a tip end portion of the flame stabilizer radially expands;
a first air ejection portion adapted to eject first air in a first ejecting direction toward a tip end portion side of the first air ejection portion between one of the main burners and the flame stabilizer,
the first ejecting direction having an axial center direction component and a radial direction component;
a second air ejection portion adapted to circulate second air toward a tip end portion side of the second air ejection portion that is radially outside the flame stabilizer and eject the second air toward a radially outward direction;
and a change member adapted to change a second ejecting direction of the second air ejected through the second air ejection portion to an axial center direction of the flame stabilizer,
wherein the change member is adapted to change the second ejecting direction of the second air ejected through the second air ejection portion in the axial center direction to become an opposite direction to the axial center direction component of the first ejecting direction of the first air ejected through the first air ejection portion.

2. The gas turbine combustor according to claim 1, wherein:
the second air ejection portion includes:
a first air passage radially outside the flame stabilizer that is adapted to circulate the second air toward a tip end portion side of the first air passage,
a second air passage adapted to circulate the second air from the tip end portion side of the first air passage toward the radially outward direction,
and an air ejection port in a radially outward end of the second air passage,
wherein the change member is in the air ejection port;
the flame stabilizer includes:
a flame stabilizer body having a cylindrical shape,
tapered cylinder portion having a tapered cylinder shape continuing to the tip end portion of the flame stabilizer,
a tapered external cylinder portion radially outside the tapered cylinder portion having a tapered cylinder shape continuing to the tip end portion of the flame stabilizer, and
a predetermined space between the tapered cylinder portion and the tapered external cylinder portion; and
wherein the first air passage, the second air passage, and the air ejection port are between the tapered cylinder portion and the tapered external cylinder portion,
and the change member is positioned in the tapered cylinder portion.

3. The gas turbine combustor according to claim 2, wherein the change member is in a tip end portion of the tapered cylinder portion.

4. The gas turbine combustor according to claim 2, wherein at least one of the main burners includes a main burner cylinder, a main nozzle in a central portion of the main burner cylinder, and a swirler vane between the main burner cylinder and the main nozzle; and
the change member extends around a whole circumferential area of the tapered cylinder portion of the flame stabilizer.

5. The gas turbine combustor according to claim 2, wherein at least one of the main burners includes a main burner cylinder, a main nozzle in a central portion of the main burner cylinder, and a swirler vane between the main burner cylinder and the main nozzle; and
the change member extends along a part of a whole circumferential area of the tapered cylinder portion of the flame stabilizer.

6. The gas turbine combustor according to claim 2, wherein the tapered cylinder portion is configured such that divided bodies are combined in a cylindrical shape,
and the change member is positioned in at least a partial area of the divided bodies.

7. A gas turbine comprising:
a compressor adapted to compress air;
the gas turbine combustor of claim 1, adapted to mix and burn compressed air compressed by the compressor with a fuel; and
a turbine adapted to obtain rotary power by expanding a combustion gas generated by the gas turbine combustor.

* * * * *